D. A. BAINTER & J. J. BERLING.
DEVICE FOR PICKING CHICKENS.
APPLICATION FILED JULY 1, 1907.
908,933.
Patented Jan. 5, 1909.
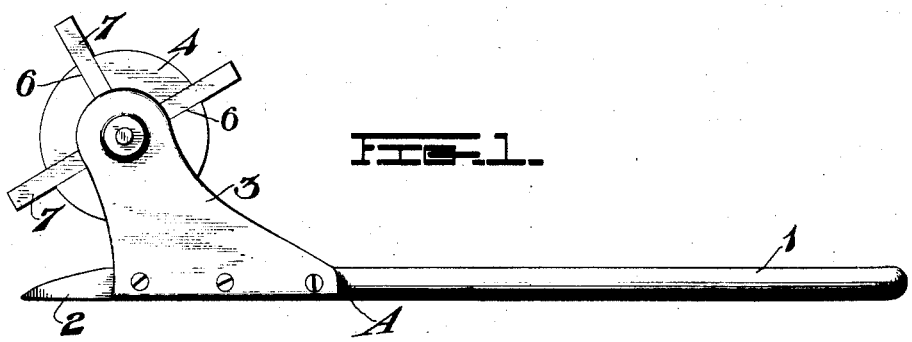
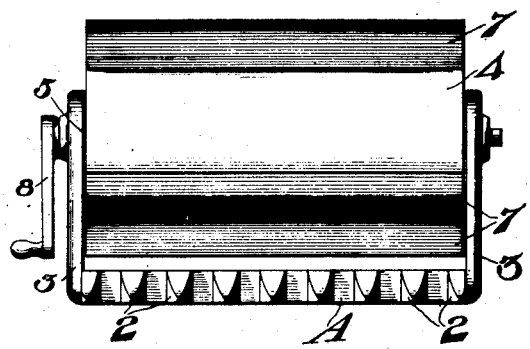
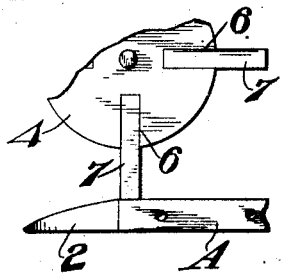
Witnesses
C. Evans.
A. A. Hammond.
Inventors
David A. Bainter
and Joseph J. Berling
By
Their Attorney

UNITED STATES PATENT OFFICE.

DAVID A. BAINTER AND JOSEPH J. BERLING, OF DECATUR, INDIANA.

DEVICE FOR PICKING CHICKENS.

No. 908,933.  Specification of Letters Patent.  Patented Jan. 5, 1909.

Application filed July 1, 1907. Serial No. 381,702.

*To all whom it may concern:*

Be it known that we, DAVID A. BAINTER and JOSEPH J. BERLING, citizens of the United States, residing at Decatur, in the county of Adams and State of Indiana, have invented certain new and useful Improvements in Devices for Picking Chickens, of which the following is a specification.

Our invention relates to an improvement in devices for picking chickens, or removing hair from hogs, and the object is to provide a simple device which can be passed over the body of the fowl or hog without injury to the flesh.

The invention relates to certain other novel features of construction and combinations of parts which will be hereinafter described and pointed out in the claim.

In the accompanying drawings:—Figure 1 is a view in side elevation. Fig. 2 is a front view. Fig. 3 is a detail.

A, represents the base having teeth 2, 2, formed on the end, and a handle 1 is formed on the other end. Secured to the sides of the base are plates 3, 3, having a head 4 journaled therein, which is rotated by a crank 8, or power motor connected to the shaft 5 of the head. The head is provided with a series of transverse grooves or slots 6, in which are received the blades 7.

In operation the base is placed on the body of the fowl, in the same manner as horse clippers, the teeth being forced through the feathers and the head is rotated whereby the feathers are caught between the base and edge of the blades, and caused to be drawn rearward whereby they are withdrawn from the body of the fowl. The same means would apply in removing the hair from hogs.

It will be seen that a very simple, cheap and inexpensive device has been produced which is easy to handle and not cumbersome.

It is evident that many slight changes might be made in the form and arrangement of the several parts described without departing from the spirit and scope of our invention, and hence we do not wish to be limited to the exact construction herein set forth, but:—

Having fully described our invention, what we claim as new and desire to secure by Letters Patent, is:—

As an article of manufacture, a hand tool for picking chickens and removing hair from hogs consisting of a frame having a handle at one end and teeth at the other, and a head journaled in the frame, means for rotating said head and blades thereon which coöperate with the teeth on the frame whereby to remove the feathers or hair as the operator guides and controls the device by manipulating the handle.

In testimony whereof we have signed our names to this specification in the presence of two subscribing witnesses.

DAVID A. BAINTER.
JOSEPH J. BERLING.

Witnesses:
PAUL G. HOOPER,
HARVEY WARRUFF.